United States Patent
Hilton et al.

(10) Patent No.: US 11,623,361 B2
(45) Date of Patent: Apr. 11, 2023

(54) AUTOMATED FIBER PLACEMENT (AFP) CUTTER BLADE ASSEMBLIES, AFP CUTTER SYSTEMS INCLUDING THE SAME, AND ASSOCIATED METHODS

(71) Applicant: The Boeing Company, Chicago, IL (US)

(72) Inventors: Corydon D. Hilton, North Charleston, SC (US); William D. Lindenberg, Summerville, SC (US); Bryan Robert McLaughlin, North Charleston, SC (US); Derek Scott McCann, Ladson, SC (US)

(73) Assignee: The Boeing Company, Arlington, VA (US)

( * ) Notice: Subject to any disclaimer, the term of this patent is extended or adjusted under 35 U.S.C. 154(b) by 110 days.

(21) Appl. No.: 16/735,510

(22) Filed: Jan. 6, 2020

(65) Prior Publication Data
US 2021/0206016 A1 Jul. 8, 2021

(51) Int. Cl.
| | |
|---|---|
| *B26D 7/26* | (2006.01) |
| *B26D 1/00* | (2006.01) |
| *B29C 70/38* | (2006.01) |
| *B29C 70/54* | (2006.01) |

(52) U.S. Cl.
CPC ......... *B26D 7/2614* (2013.01); *B26D 1/0006* (2013.01); *B29C 70/384* (2013.01); *B29C 70/545* (2013.01); *B26D 2001/0053* (2013.01)

(58) Field of Classification Search
CPC ............... B26D 1/0006; B26D 7/2614; B26D 2001/00532; B27L 11/005
USPC ............................. 144/241; 241/298; 83/549
See application file for complete search history.

(56) References Cited

U.S. PATENT DOCUMENTS

| | | | | |
|---|---|---|---|---|
| 4,047,670 A | * | 9/1977 | Svensson | B02C 18/143 |
| | | | | 241/92 |
| 4,545,413 A | * | 10/1985 | Sundberg et al. | B27L 11/005 |
| | | | | 144/130.2 |
| 4,754,789 A | * | 7/1988 | Jonsson | B27G 13/10 |
| | | | | 144/241 |

(Continued)

FOREIGN PATENT DOCUMENTS

| | | | | | |
|---|---|---|---|---|---|
| CA | 2 514 442 | * | 8/2004 | ............ | B27L 11/005 |
| DE | 37 28 338 A1 | * | 3/1988 | ............ | B27L 11/005 |

*Primary Examiner* — Ghassem Alie
(74) *Attorney, Agent, or Firm* — Kolitch Romano Dascenzo Gates LLC

(57) ABSTRACT

Automated fiber placement (AFP) cutter blade assemblies, AFP cutter systems including the same, and associated methods. An AFP cutter blade assembly includes a blade base and a reversible blade insert configured to be coupled to the blade base in either of a first cutter blade configuration, in which a first cutting edge is an active cutting edge, and a second cutter blade configuration, in which a second cutting edge is the active cutting edge. In examples, an AFP cutter system includes a plurality of AFP cutter blade assemblies in combination with an actuator assembly. In examples, a method of reconfiguring a reversible blade insert of an AFP cutter blade assembly includes uncoupling the reversible blade insert from a blade base, rotating the reversible blade insert relative to the blade base, and operatively coupling the reversible blade insert to the blade base in a different configuration.

20 Claims, 6 Drawing Sheets

(56) References Cited

U.S. PATENT DOCUMENTS

| | | | | |
|---|---|---|---|---|
| 5,501,256 A * | 3/1996 | Dyer et al. | ............ | B27L 11/005 144/218 |
| 5,649,579 A * | 7/1997 | Kokko et al. | ......... | B27L 11/005 144/176 |
| 6,058,989 A * | 5/2000 | LaGrange et al. | .... | B27L 11/005 144/218 |
| 6,722,595 B1 * | 4/2004 | Frick et al. | ........... | B27L 11/005 241/92 |
| 6,960,049 B2 * | 11/2005 | Inayama | ................ | B23B 27/08 407/103 |
| 7,094,006 B2 * | 8/2006 | Hecht | .................... | B23B 27/08 407/103 |
| 2014/0027552 A1 * | 1/2014 | Hinchliff | ............... | B27L 11/005 241/300 |
| 2014/0199128 A1 * | 7/2014 | Hecht | ................ | B23B 27/1622 407/103 |
| 2019/0009426 A1 * | 1/2019 | Horth et al. | ........... | B27G 13/10 |
| 2019/0039336 A1 * | 2/2019 | Hilton et al. | ......... | B29C 70/384 |
| 2020/0238552 A1 * | 7/2020 | Roberts et al. | .......... | B26D 7/26 |

\* cited by examiner

AUTOMATED FIBER PLACEMENT (AFP) CUTTER BLADE ASSEMBLIES, AFP CUTTER SYSTEMS INCLUDING THE SAME, AND ASSOCIATED METHODS

FIELD

The present disclosure relates to automated fiber placement (AFP) cutter blade assemblies, AFP cutter systems including the same, and associated methods.

BACKGROUND

Manufacturing systems for composite materials, such as in the context of aerospace manufacturing, frequently utilize automated fiber placement (AFP) systems for placing fiber tows onto a work piece. Such AFP systems generally utilize cutter blades for selectively severing the fiber tows as the fiber tows exit the AFP system. In the event that the cutter blades endure wear and breakage, the cutter blades need to be replaced, incurring costs both in the form of the material cost of the new cutter blade as well as in the downtime of the AFP system while the cutter blade is replaced.

SUMMARY

Automated fiber placement (AFP) cutter blade assemblies, AFP cutter systems including the same, and associated methods are disclosed herein. An AFP cutter blade assembly includes a blade base and a reversible blade insert that is configured to be selectively and operatively coupled to the blade base in either of a first cutter blade configuration and a second cutter blade configuration. The reversible blade insert includes a first blade body portion that terminates in a first cutting edge and a second blade body portion that terminates in a second cutting edge. When the reversible blade insert is in the first cutter blade configuration, the first cutting edge is an active cutting edge that is exposed and operable to cut fiber tows, and the second cutting edge is an inactive cutting edge that is at least partially disabled from cutting fiber tows by the blade base. When the reversible blade insert is in the second cutter blade configuration, the second cutting edge is the active cutting edge and the first cutting edge is the inactive cutting edge.

In some examples, an AFP cutter system includes a plurality of AFP cutter blade assemblies in combination with an actuator assembly that is configured to selectively translate the active cutting edge of the reversible blade insert of each AFP cutter blade assembly toward a respective fiber tow to selectively cut the fiber tow.

In some examples, a method of reconfiguring a reversible blade insert of an AFP cutter blade assembly that is operatively coupled to a blade base includes uncoupling the reversible blade insert from the blade base, rotating the reversible blade insert relative to the blade base, and operatively coupling the reversible blade insert to the blade base in a different configuration. In some examples, the reversible blade insert includes a first cutting edge and a second cutting edge such that one of the first cutting edge and the second cutting edge is an initially active cutting edge that is exposed, and such that the other of the first cutting edge and the second cutting edge is an initially inactive cutting edge that is at least partially disabled by the blade base. In such examples, the rotating the reversible blade insert relative to the blade base includes exposing the initially inactive cutting edge, and the operatively coupling the reversible blade insert to the blade base is performed such that the initially inactive cutting edge is a finally active cutting edge that is exposed and such that the initially active cutting edge is a finally inactive cutting edge that is at least partially disabled by the blade base.

DESCRIPTION

Figure 1:
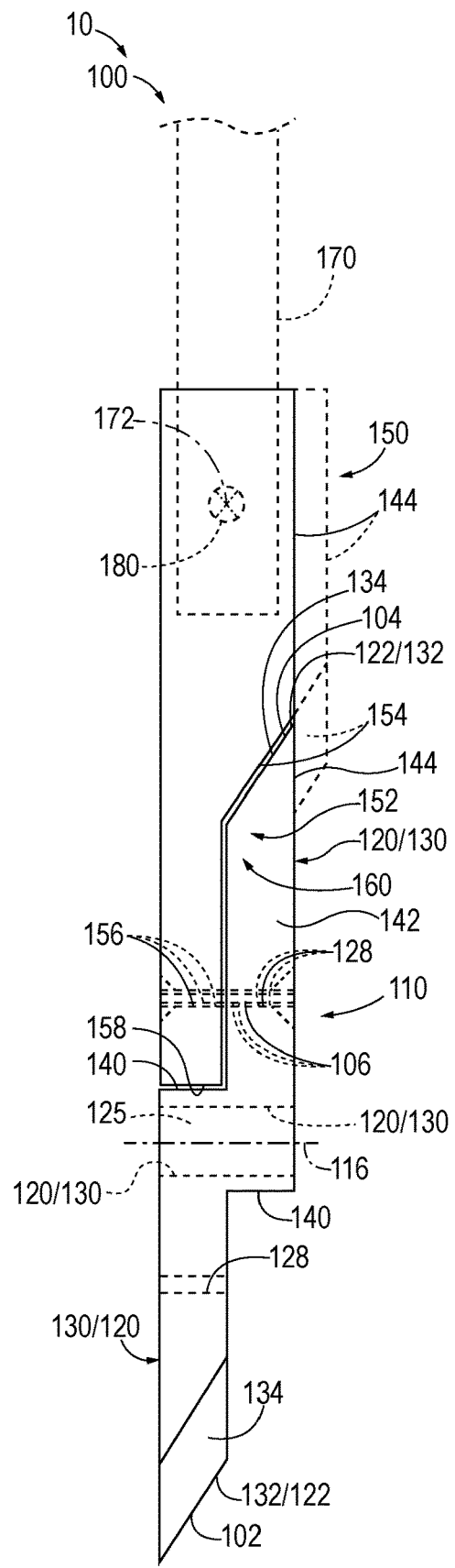
FIG. 1 is a schematic fragmentary side elevation view illustrating examples of automated fiber placement (AFP) cutter blade assemblies according to the present disclosure.

FIGS. 1-9 provide illustrative, non-exclusive examples of automated fiber placement (AFP) cutter blade assemblies 100, of reversible blade inserts 110 and/or blade bases 150 of AFP cutter blade assemblies 100, of AFP cutter systems 10 incorporating AFP cutter blade assemblies 100, and/or of methods 200 of reconfiguring reversible blade inserts 110 of AFP cutter blade assemblies 100, according to the present disclosure. Elements that serve a similar, or at least substantially similar, purpose are labeled with like numbers in each of FIGS. 1-9, and these elements may not be discussed in detail herein with reference to each of FIGS. 1-9. Similarly, all elements may not be labeled in each of FIGS. 1-9, but reference numerals associated therewith may be utilized herein for consistency. Elements, components, and/or features that are discussed herein with reference to one or more of FIGS. 1-9 may be included in and/or utilized with any of FIGS. 1-9 without departing from the scope of the present disclosure. Generally, in the Figures, elements that are likely to be included in a given example are illustrated in solid lines, while elements that are optional to a given example are illustrated in dashed lines. However, elements that are illustrated in solid lines are not essential to all examples of the present disclosure, and an element shown in solid lines may be omitted from a particular example without departing from the scope of the present disclosure.

Figure 2:
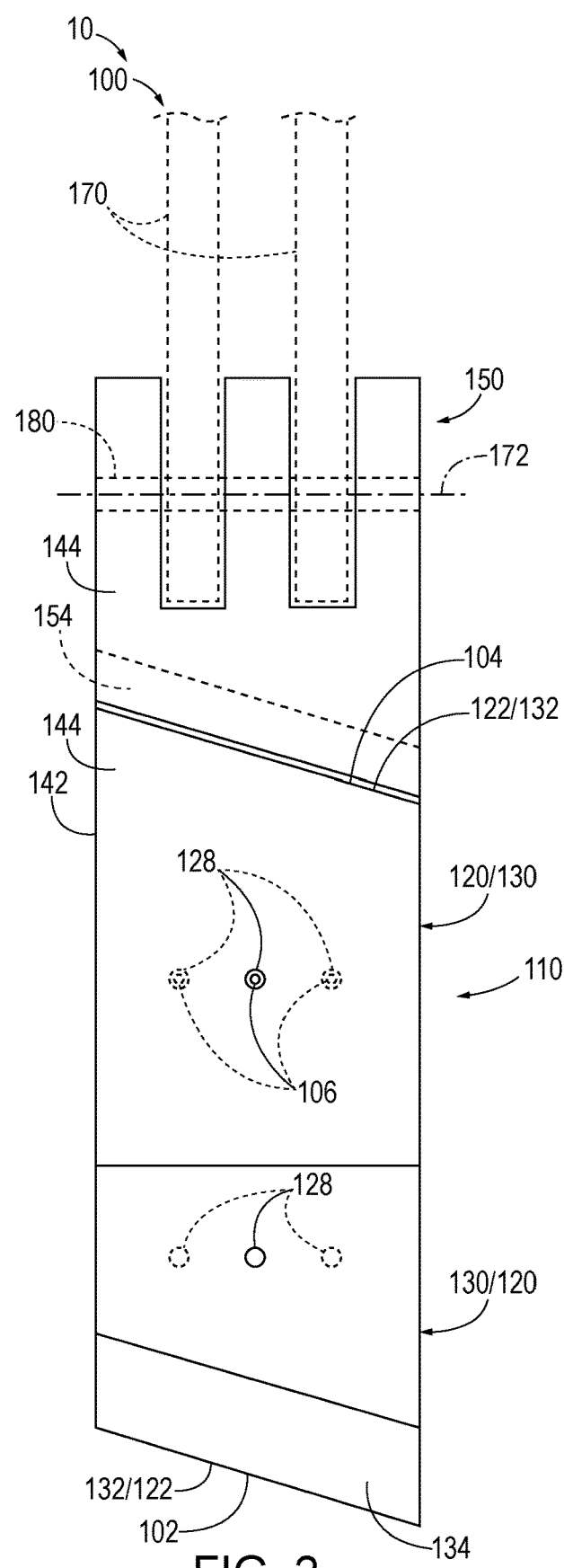
FIG. 2 is a schematic fragmentary top plan view illustrating examples of AFP cutter blade assemblies according to the present disclosure.
Figure 3:
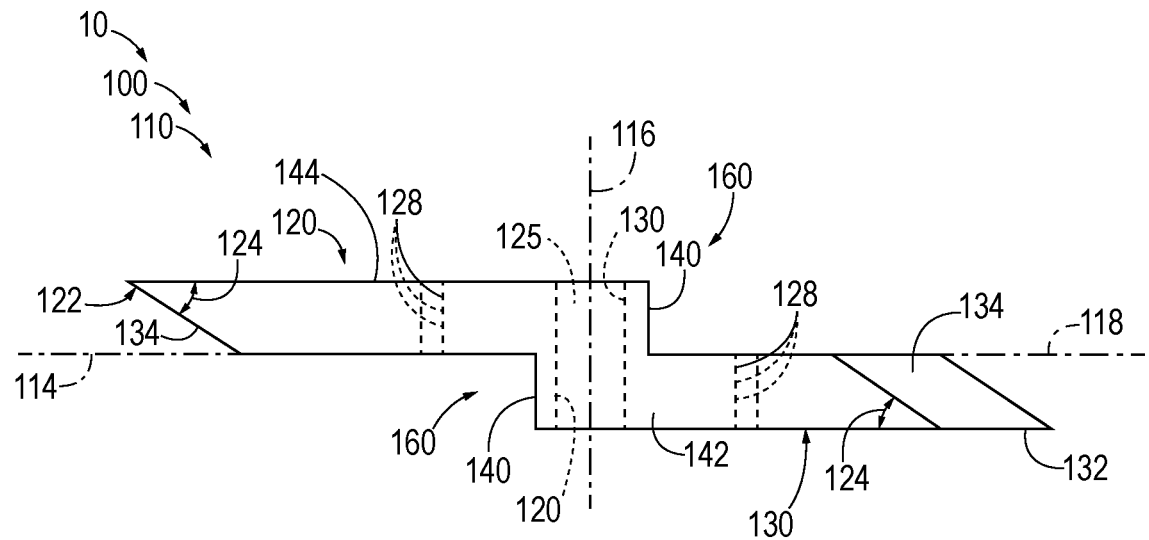
FIG. 3 is a schematic side elevation view illustrating examples of reversible blade inserts according to the present disclosure.
Figure 4:
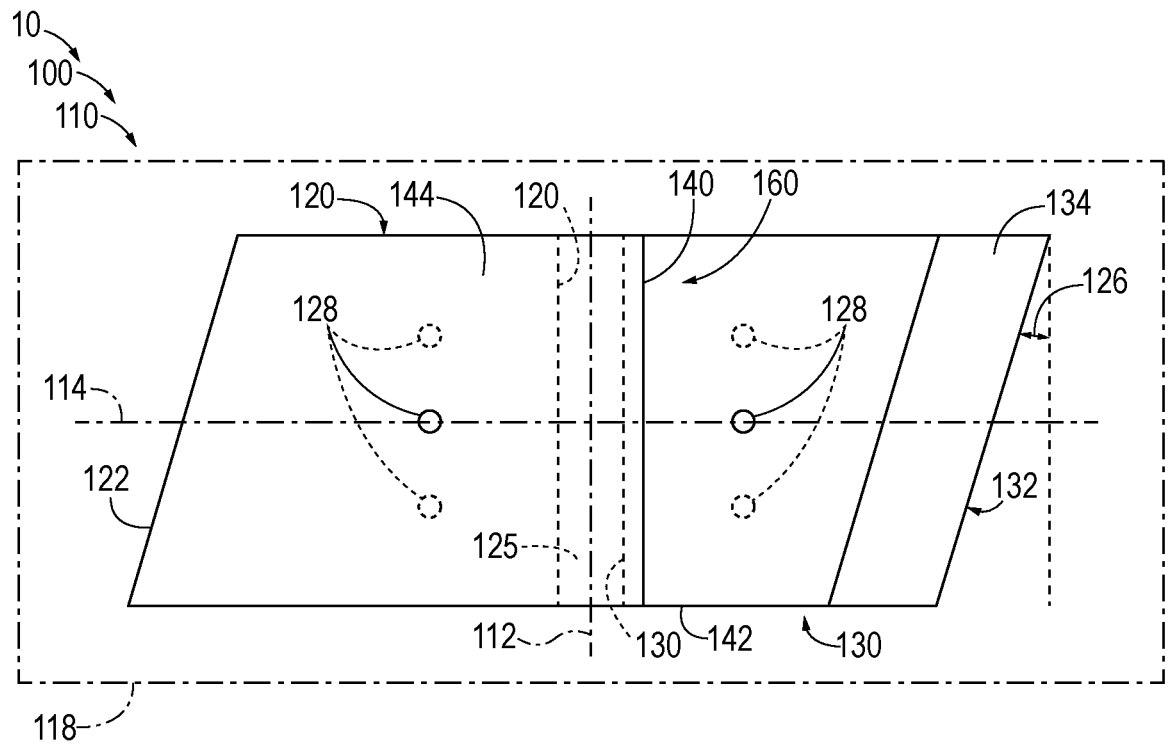
FIG. 4 is a schematic top plan view illustrating examples of reversible blade inserts according to the present disclosure.
Figure 5:
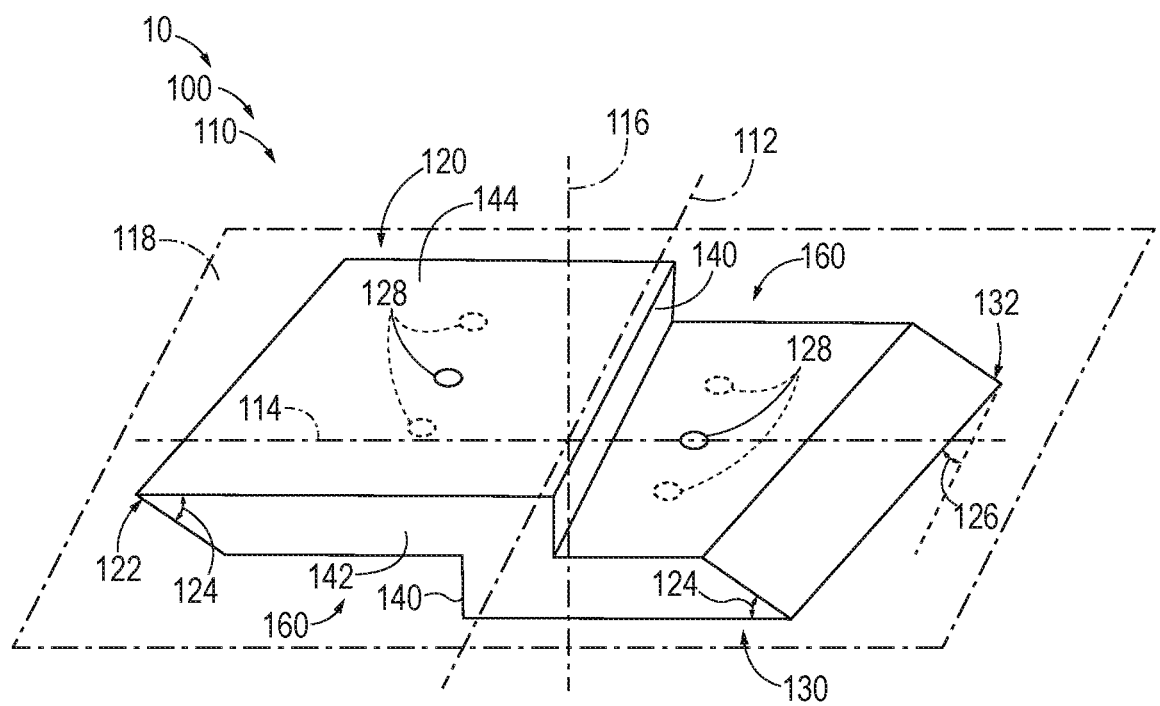
FIG. 5 is a front side isometric view illustrating examples of reversible blade inserts according to the present disclosure.
Figure 6:
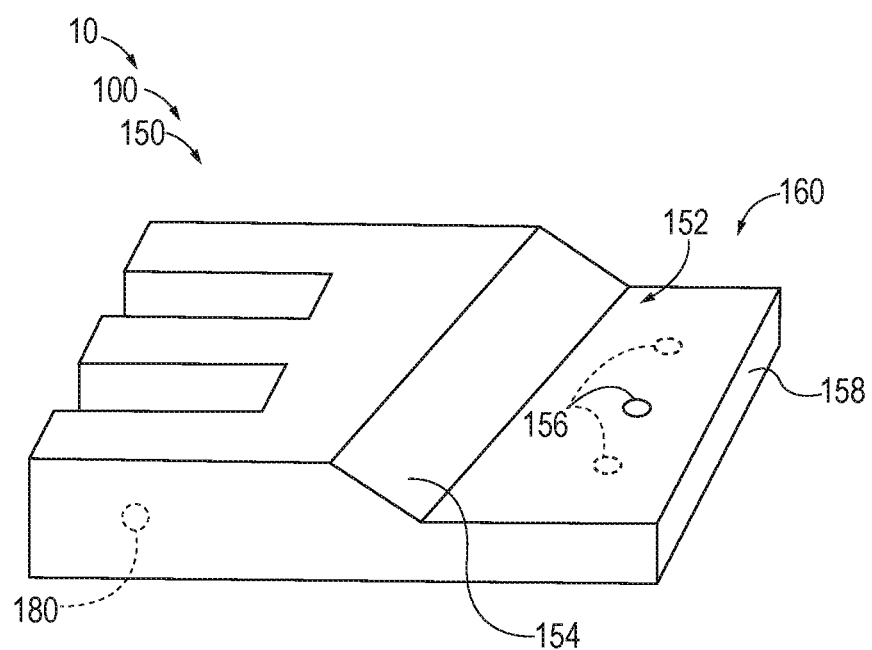
FIG. 6 is a front side isometric view illustrating examples of blade bases according to the present disclosure.
Figure 7:
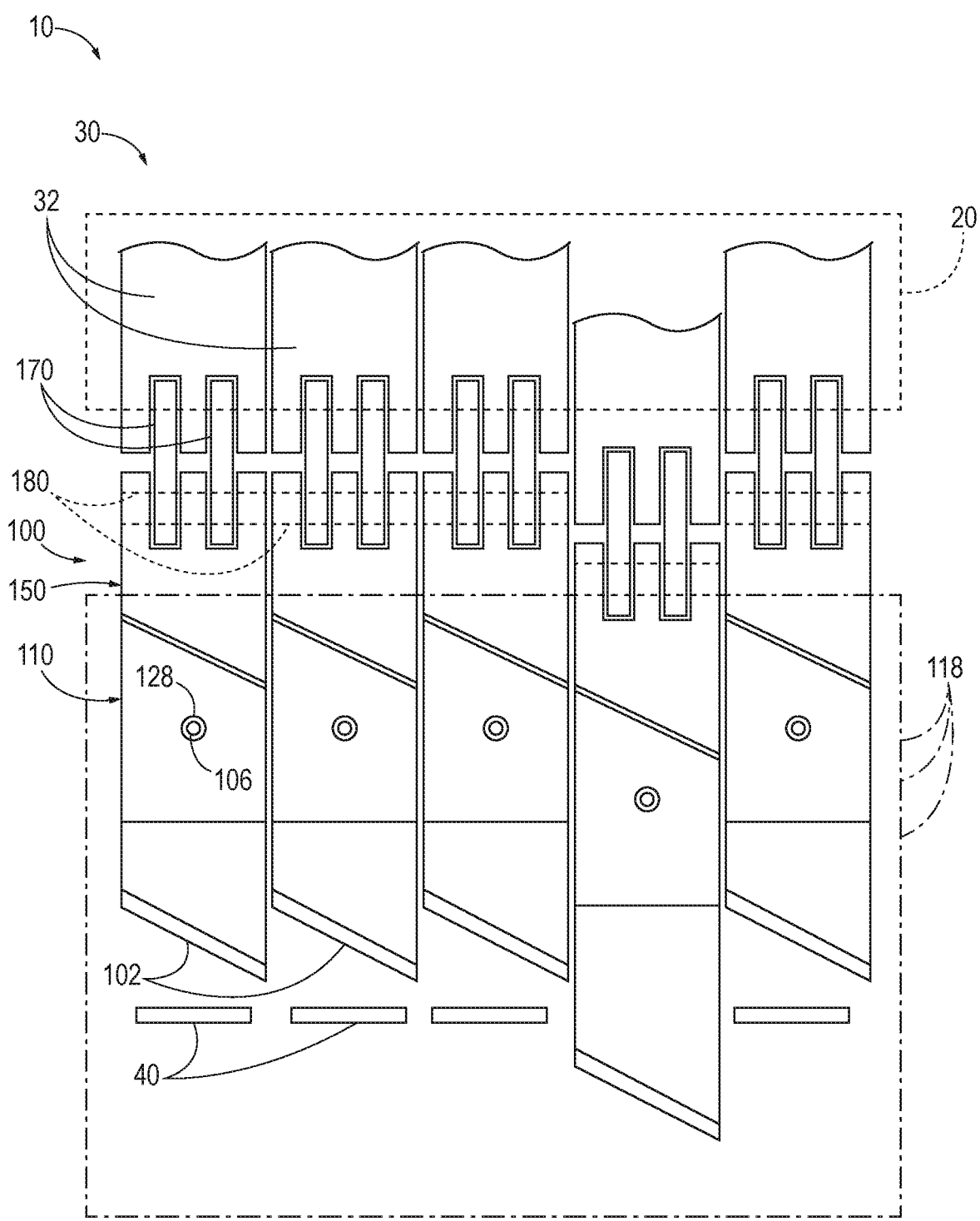
FIG. 7 is a schematic fragmentary top plan view illustrating examples of AFP cutter systems according to the present disclosure.

FIGS. 1-2 schematically illustrate examples of AFP cutter blade assemblies 100 according to the present disclosure. As schematically illustrated in FIGS. 1-2, an AFP cutter blade assembly 100 includes a blade base 150 and a reversible blade insert 110. FIGS. 1-2 schematically illustrate reversible blade insert 110 operatively coupled to blade base 150, as described herein, while FIGS. 3-5 provide additional schematic illustrations of reversible blade insert 110, and FIG. 6 provides an additional schematic illustration of blade base 150. FIG. 7 is a schematic representation of an AFP cutter system 10 that includes a plurality of AFP cutter blade assemblies 100, as described in more detail below.

AFP cutter blade assemblies 100 according to the present disclosure generally are operable to perform cutting operations in the context of AFP manufacturing methods. Thus, reversible blade insert 110 generally is configured for cutting fiber tows 40 (schematically illustrated in FIG. 7), such as may form at least a portion of a work piece formed via the AFP manufacturing methods. More specifically, and as schematically illustrated in FIGS. 1-5, reversible blade insert 110 includes a first blade body portion 120 that terminates in a first cutting edge 122, as well as a second blade body portion 130 that terminates in a second cutting edge 132, with each of first cutting edge 122 and second cutting edge 132 being operable to cut fiber tows. AFP cutter blade assembly 100 may be configured for cutting fiber tows of any appropriate construction, such as fiber tows that include a carbon fiber and/or a prepreg fiber. Similarly, each of reversible blade insert 110 and blade base 150 may be formed of any appropriate material, examples of which include metal, a steel, D2 tool steel, and/or carbide. In some examples, AFP cutter blade assembly 100 and/or AFP cutter system 10 is utilized in the context of aerospace manufacturing.

As described in more detail herein, reversible blade insert 110 is configured to be selectively and operatively coupled to blade base 150 in one of two distinct configurations such that either one of first cutting edge 122 and second cutting edge 132 is exposed and operable for cutting operations. By contrast, prior art designs of AFP cutter blades generally include a blade that is integrally formed with and/or brazed onto a base portion, or include a blade insert with a single cutting edge that is operatively coupled to a base portion in only a single configuration. Because AFP cutter blade assemblies 100 according to the present disclosure include reversible blade insert 110 with two distinct cutting edges, the usable lifespan of reversible blade insert 110 may effectively be doubled relative to a prior art design that includes only a single edge. Utilizing reversible blade insert 110 also may decrease a manufacturing system downtime associated with replacing a worn or broken blade by enabling a fast and simple reconfiguring of reversible blade insert 110 for renewed operative use, such as via methods 200 described herein.

With particular reference to FIGS. 1-2, reversible blade insert 110 is configured to be selectively and operatively coupled to blade base 150 in either of a first cutter blade configuration and a second cutter blade configuration. Specifically, when reversible blade insert 110 is in the first cutter blade configuration, first cutting edge 122 is an active cutting edge 102 that is exposed and operable to cut fiber tows, and second cutting edge 132 is an inactive cutting edge 104 that is at least partially disabled from cutting fiber tows by blade base 150. Similarly, when reversible blade insert 110 is in the second cutter blade configuration, second cutting edge 132 is active cutting edge 102 and first cutting edge 122 is inactive cutting edge 104. As used herein, a cutting edge (such as first cutting edge 122, second cutting edge 132, and/or inactive cutting edge 104) may be described as being "disabled" when an alignment, abutment, and/or other orientation of the cutting edge relative to blade base 150 renders the cutting edge inoperable to perform cutting operations, such as cutting fiber tows. As an example, and as schematically illustrated in FIGS. 1-2, inactive cutting edge 104 may abut and/or lie adjacent to blade base 150 such that inactive cutting edge 104 is not exposed. Additionally or alternatively, inactive cutting edge 104 may be at least partially covered, concealed, and/or blocked by blade base 150.

First blade body portion 120 and second blade body portion 130 may include, be, and/or refer to any appropriate components of reversible blade insert 110. In some examples, first blade body portion 120 and second blade body portion 130 are monolithic, integrally formed, and/or coextensive. In such examples, first blade body portion 120 and second blade body portion 130 may be described as referring to respective portions, regions, and/or components of a single body. In other examples, and as schematically illustrated in dashed lines in FIGS. 1 and 3-4, first blade body portion 120 and second blade body portion 130 are distinct components that are operatively coupled to one another to at least partially form reversible blade insert 110. In such examples, first blade body portion 120 and second blade body portion 130 may be operatively coupled to one another in any appropriate manner, such as via welding, brazing, an adhesive, and/or a mechanical fastener. In some examples, first blade body portion 120 and second blade body portion 130 are directly coupled to one another. In other examples, first blade body portion 120 and second blade body portion 130 are indirectly coupled to one another, such as via an intermediate component 125.

With particular reference to FIGS. 3-5, aspects, components, and/or shapes of reversible blade insert 110 may be described with reference to various geometrical planes and/or axes that may be defined relative to reversible blade insert 110. For example, and as schematically illustrated in FIGS. 3-5, reversible blade insert 110 may be described as including a longitudinal axis 114 that extends between first cutting edge 122 and second cutting edge 132, as well as a lateral axis 112 (shown in FIGS. 4-5) that extends perpendicular to longitudinal axis 114. In some examples, and as perhaps best schematically illustrated in FIG. 5, reversible blade insert 110 is at least substantially rotationally symmetric about lateral axis 112. Stated differently, in such examples, reversible blade insert 110 has a shape that is at least substantially unchanged upon a 180° rotation of reversible blade insert 110 about lateral axis 112. Additionally or alternatively, in some examples, reversible blade insert 110 is at least substantially symmetric about longitudinal axis 114 and/or about a plane that includes longitudinal axis 114, such as a plane that is perpendicular to lateral axis 112. Stated differently, in such examples, reversible blade insert 110 may have a shape that is at least substantially unchanged upon being mirrored about the plane that includes longitudinal axis 114 and that is perpendicular to lateral axis 112. As further schematically illustrated in FIGS. 3-5, reversible blade insert 110 also may be described as extending at least substantially within an insert plane 118 that extends parallel to each of lateral axis 112 and longitudinal axis 114. As examples, insert plane 118 may include one or both of lateral axis 112 and longitudinal axis 114, and/or may be parallel to a plane that includes one or both of lateral axis 112 and longitudinal axis 114. In some examples, and as schematically illustrated in FIGS. 3-5, each of first cutting edge 122 and second cutting edge 132 extends at least substantially parallel to insert plane 118. As further schematically illustrated in FIGS. 3 and 5, reversible blade insert 110 further may be described as having a transverse axis 116 that extends perpendicular to each of lateral axis 112 and longitudinal axis 114. In this manner, transverse axis 116 also may be described as extending perpendicular to insert plane 118.

Each of first cutting edge 122 and second cutting edge 132 may have any appropriate shape, such as may be configured for cutting fiber tows. In some examples, and as schematically illustrated in FIGS. 1-5, first cutting edge 122 and second cutting edge 132 are at least substantially identical in shape. However, this is not required of all examples of reversible blade insert 110, and it is additionally within the scope of the present disclosure that first cutting edge 122 and second cutting edge 132 have distinct shapes. In some examples, and as schematically illustrated in FIGS. 1-5, each of first blade body portion 120 and second blade body portion 130 includes an oblique blade surface 134, such as may extend oblique to insert plane 118 (shown in FIGS. 3-5). More specifically, in such examples, oblique blade surface 134 of first blade body portion 120 partially defines first cutting edge 122, and oblique blade surface 134 of second blade body portion 130 partially defines second cutting edge 132.

In some examples, first cutting edge 122 and/or second cutting edge 132 is characterized by one or more angles defining each cutting edge. For example, first cutting edge 122 and/or second cutting edge 132 may be described as a chiseled cutting edge and/or as a guillotine blade. As more specific examples, and as schematically illustrated in FIGS. 3 and 5, first cutting edge 122 and/or second cutting edge 132 may have a cutting edge internal angle 124, as measured through a plane perpendicular to lateral axis 112 (shown in FIG. 5), that is at least 5 degrees, at least 10 degrees, at least 15 degrees, at least 20 degrees, at least 25 degrees, at most 30 degrees, at most 22 degrees, at most 17 degrees, at most 12 degrees, and/or at most 7 degrees. In some examples, cutting edge internal angle 124 of first cutting edge 122 is at least substantially identical to cutting edge internal angle 124 of second cutting edge 132. In other examples, cutting edge internal angle 124 of first cutting edge 122 is distinct from cutting edge internal angle 124 of second cutting edge 132. While FIGS. 1, 3, and 5 schematically illustrate each of first cutting edge 122 and second cutting edge 132 as being at least substantially sharp (e.g., as being formed at an intersection of two angled planar surfaces), this is not required of all examples of reversible blade insert 110. For example, it additionally is within the scope of the present disclosure that first cutting edge 122 and/or second cutting edge 132 may be a honed edge and/or may have a profile that is at least partially curved and/or may have a radius.

As additional examples, and as schematically illustrated in FIGS. 4-5, first cutting edge 122 and/or second cutting edge 132 may have a cutting edge bias angle 126, as measured from a direction parallel to lateral axis 112 and through a plane parallel to insert plane 118, that is of 0 degrees, at least 5 degrees, at least 10 degrees, at least 20 degrees, at least 30 degrees, at least 40 degrees, at least 50 degrees, at most 60 degrees, at most 45 degrees, at most 35 degrees, at most 25 degrees, at most 15 degrees, at most 7 degrees, and/or at most 2 degrees. In some examples, cutting edge bias angle 126 of first cutting edge 122 is at least substantially identical to cutting edge bias angle 126 of second cutting edge 132. In other examples, cutting edge bias angle 126 of first cutting edge 122 is distinct from cutting edge bias angle 126 of second cutting edge 132.

Reversible blade insert 110 may be operatively coupled to blade base 150 in any appropriate manner. In some examples, and as schematically illustrated in FIGS. 1-2, reversible blade insert 110 is configured to be operatively coupled to blade base 150 by one or more mechanical fasteners 106, such as may extend at least partially through each of reversible blade insert 110 and blade base 150. In some such examples, and as schematically illustrated in FIGS. 1-5, each of first blade body portion 120 and second blade body portion 130 defines one or more insert fastener receivers 128 that each are operable to receive a corresponding mechanical fastener 106 to operatively couple reversible blade insert 110 to blade base 150. In some such examples, each insert fastener receiver 128 is a hole that extends fully through reversible blade insert 110 along a direction at least substantially parallel to transverse axis 116. Similarly, in some examples, and as schematically illustrated in FIGS. 1 and 6, blade base 150 defines one or more base fastener receivers 156 that each are operable to receive a corresponding mechanical fastener 106 to operatively couple reversible blade insert 110 to blade base 150. In some such examples, each base fastener receiver 156 is a hole that extends fully through blade base 150 along a direction at least substantially parallel to transverse axis 116 of reversible blade insert 110 when reversible blade insert 110 is operatively coupled to blade base 150.

Each insert fastener receiver 128 and/or each base fastener receiver 156 may have any appropriate structure for receiving mechanical fastener 106, such as may correspond to a form and/or a structure of mechanical fastener 106. For example, each mechanical fastener 106 may be a threaded mechanical fastener 106, such as a screw. In some such examples, each insert fastener receiver 128 is a threaded insert fastener receiver 128. Additionally or alternatively, in some such examples, each base fastener receiver 156 is a threaded base fastener receiver 156. However, it is additionally within the scope of the present disclosure that each insert fastener receiver 128 is a smooth-bored insert fastener receiver 128 and/or that each base fastener receiver 156 is a smooth-bored base fastener receiver 156. In some examples, and as schematically illustrated in FIG. 1, each insert fastener receiver 128 may be a countersunk insert fastener receiver 128, and/or each base fastener receiver 156 may be a countersunk base fastener receiver 156. Such configurations may facilitate mechanical fastener 106 being received within countersunk insert fastener receiver 128 and/or countersunk base fastener receiver 156 in such a manner that a head portion of mechanical fastener 106 is at least substantially flush with a surface of reversible blade insert 110 and/or of blade base 150. Additional examples of mechanical fasteners 106 that may be utilized to operatively couple reversible blade insert 110 to blade base 150 include a pin, a rivet, and a bolt.

Reversible blade insert 110 may include any appropriate number of insert fastener receivers 128. As examples, each of first blade body portion 120 and/or second blade body portion 130 may define one insert fastener receiver 128, two insert fastener receivers 128, three insert fastener receivers 128, or more than three insert fastener receivers 128. Similarly, blade base 150 may define one base fastener receiver 156, two base fastener receivers 156, three base fastener receivers 156, or more than three base fastener receivers 156. While FIGS. 2 and 4-5 schematically illustrate each of first blade body portion 120 and second blade body portion 130 as defining a plurality of insert fastener receivers 128 that are spaced apart along a direction parallel to lateral axis 112, it is additionally within the scope of the present disclosure that insert fastener receivers 128 of first blade body portion 120 and/or of second blade body portion 130 are spaced apart along a direction parallel to longitudinal axis 114. Utilizing a plurality of mechanical fasteners 106 with a plurality of spaced apart insert fastener receivers 128 and a corresponding plurality of spaced apart base fastener receivers 156 may augment a strength of the coupling between reversible blade insert 110 and blade base 150, such as to restrict or prevent reversible blade insert 110 from pivoting and/or translating relative to blade base 150. Alternatively, utilizing a single mechanical fastener 106 with a single insert fastener receiver 128 and corresponding single base fastener receiver 156 may facilitate quickly transitioning reversible blade insert 110 between the first cutter blade configuration and the second cutter blade configuration.

While the examples disclosed and discussed herein generally relate to examples in which reversible blade insert 110 is operatively coupled to blade base 150 via mechanical fastener(s) 106, this is not required of all examples of AFP cutter blade assembly 100. For example, it is additionally within the scope of the present disclosure that reversible blade insert 110 is operatively coupled to blade base 150 at least partially via a non-mechanical fastening mechanism, such as a magnetic fastening mechanism.

It generally is desirable that reversible blade insert 110 remain in static engagement with blade base 150 during operative use of AFP cutter blade assembly 100, such as to ensure efficient and reliable cutting operation while minimizing wear and strain on AFP cutter blade assembly 100. Accordingly, reversible blade insert 110 and blade base 150 generally are shaped, sized, and/or otherwise configured for static engagement with one another. In some examples, and as schematically illustrated in FIGS. 1 and 3-6, AFP cutter blade assembly 100 includes an alignment structure 160 that is configured to maintain reversible blade insert 110 and blade base 150 in static engagement with one another when reversible blade insert 110 is operatively coupled to blade base 150. In such examples, one or both of reversible blade insert 110 and blade base 150 may be described as including at least a portion of alignment structure 160.

Alignment structure 160 may include and/or be any appropriate components and/or features for promoting, facilitating, and/or ensuring static engagement between reversible blade insert 110 and blade base 150. In some examples, alignment structure 160 includes one or more components of each of reversible blade insert 110 and blade base 150 that are configured to mechanically interlock in a close-fit arrangement with one another when reversible blade insert 110 is operatively coupled to blade base 150. Additionally or alternatively, in some examples, alignment structure 160 is configured to guide reversible blade insert 110 into alignment with blade base 150 as reversible blade insert 110 approaches the first cutter blade configuration or the second cutter blade configuration (e.g., while operatively coupling reversible blade insert 110 to blade base 150). In this manner, alignment structure 160 may facilitate a proper alignment of reversible blade insert 110 and blade base 150, such as by facilitating alignment between each base fastener receiver 156 with a corresponding insert fastener receiver 128 prior to installing each mechanical fastener 106 in AFP cutter blade assembly 100.

In some examples, alignment structure 160 is configured to prevent reversible blade insert 110 from pivoting with respect to blade base 150, such as about an axis parallel to lateral axis 112, longitudinal axis 114, and/or transverse axis 116, while reversible blade insert 110 is operatively coupled to blade base 150. Similarly, in some examples, alignment structure 160 is configured to prevent reversible blade insert 110 from translating with respect to blade base 150, such as along a direction parallel to lateral axis 112, longitudinal axis 114, and/or transverse axis 116, while reversible blade insert 110 is operatively coupled to blade base 150. As used herein, the term "prevent," as used to describe a mechanism or action in opposition to a process or outcome, is intended to indicate that the mechanism or action operates to fully block and/or preclude the process or outcome from proceeding and/or being completed during operative use of the structures and components according to the present disclosure. Stated differently, as used herein, the term "prevent" is not intended to indicate that the mechanism or action will fully block and/or preclude the process or outcome from proceeding and/or being completed in all possible uses, but rather is intended to indicate that the process or outcome is prevented at least when the structures and components disclosed herein are utilized in a manner consistent with the present disclosure.

Alignment structure 160 may include and/or be any appropriate component of reversible blade insert 110 and/or of blade base 150. In some examples, and as schematically illustrated in FIG. 1, blade base 150 includes a blade base end surface 158 that is at least substantially flat, and each of first blade body portion 120 and second blade body portion 130 defines a respective insert shoulder surface 140 that engages blade base end surface 158 when reversible blade insert 110 is operatively coupled to blade base 150. More specifically, in such examples, insert shoulder surface 140 of first blade body portion 120 engages blade base end surface 158 when reversible blade insert 110 is in the first cutter blade configuration, and insert shoulder surface 140 of second blade body portion 130 engages blade base end surface 158 when reversible blade insert 110 is in the second cutter blade configuration. In this manner, engagement between insert shoulder surface 140 and blade base end surface 158 may operate to facilitate and/or maintain alignment of reversible blade insert 110 relative to blade base 150. Thus, in such examples, alignment structure 160 may be described as including each insert shoulder surface 140 and/or blade base end surface 158.

In some examples in which reversible blade insert 110 includes insert shoulder surfaces 140, and as schematically illustrated in FIGS. 3 and 5, each insert shoulder surface 140 extends at least substantially perpendicular to longitudinal axis 114. Additionally or alternatively, and as schematically illustrated in FIG. 1, insert shoulder surface 140 and blade base end surface 158 may be at least substantially parallel to one another when reversible blade insert 110 is operatively coupled to blade base 150. While FIG. 1 schematically illustrates insert shoulder surface 140 as being spaced apart from blade base end surface 158 for clarity, this is not required, and it is additionally within the scope of the present disclosure that insert shoulder surface 140 and blade base end surface 158 are in direct engagement with one another when reversible blade insert 110 is operatively coupled to blade base 150.

In some examples, and as schematically illustrated in FIGS. 1 and 6, blade base 150 may be described as including a blade insert receiver 152 that receives reversible blade insert 110 when reversible blade insert 110 is operatively coupled to blade base 150. Stated differently, in such examples, blade insert receiver 152 generally corresponds to and/or refers to a portion of blade base 150 that engages, extends adjacent to, conforms to, and/or otherwise accommodates reversible blade insert 110 in a close-fit arrangement when reversible blade insert 110 is operatively coupled to blade base 150. In some examples, alignment structure 160 includes at least a portion of blade insert receiver 152. Additionally or alternatively, in some examples, blade insert receiver 152 includes and/or is one or more surfaces of blade base 150. In some such examples, blade insert receiver 152 includes blade base end surface 158. While FIG. 1 schematically illustrates reversible blade insert 110 as being spaced apart from blade insert receiver 152 for clarity, this is not required, and it is additionally within the scope of the present disclosure that blade insert receiver 152 and reversible blade insert 110 (such as the portion of reversible blade insert 110 that at least partially forms alignment structure 160) are in direct engagement with one another when reversible blade insert 110 is operatively coupled to blade base 150.

In some examples, and as schematically illustrated in FIG. 1, blade insert receiver 152 at least partially conforms to inactive cutting edge 104 to disable inactive cutting edge 104 from being operable to cut fiber tows while reversible blade insert 110 is operatively coupled to blade base 150. As an example, and as further schematically illustrated in FIG. 1 and as best schematically illustrated in FIG. 6, blade insert receiver 152 may include an oblique body surface 154 of blade base 150 that extends at least substantially adjacent to inactive cutting edge 104 (and/or the corresponding oblique blade surface 134) when reversible blade insert 110 is operatively coupled to blade base 150. In some such examples, alignment structure 160 includes oblique body surface 154. In some examples, and as further schematically illustrated in FIGS. 1 and 6, blade insert receiver 152 includes at least one surface of blade base 150, such as oblique body surface 154, that faces at least substantially the same direction as oblique blade surface 134 corresponding to active cutting edge 102 when reversible blade insert 110 is operatively coupled to blade base 150.

In some examples, and with reference to FIGS. 1-2, AFP cutter blade assembly 100 is configured such that reversible blade insert 110 and blade base 150 are at least substantially smoothly continuous with one another when reversible blade insert 110 is operatively coupled to blade base 150. For example, and as schematically illustrated in FIGS. 1-2, AFP cutter blade assembly 100 may be described as including a lateral surface 142 such that each of reversible blade insert 110 and blade base 150 forms a portion of lateral surface 142 and such that lateral surface 142 is at least substantially smoothly continuous (e.g., across an interface between reversible blade insert 110 and blade base 150) when reversible blade insert 110 is operatively coupled to blade base 150.

Additionally or alternatively, in some examples, and as schematically illustrated in FIGS. 1-2, AFP cutter blade assembly 100 may be described as including a face surface 144 such that each of reversible blade insert 110 and blade base 150 forms a portion of face surface 144 and such that face surface 144 is at least substantially smoothly continuous (e.g., across an interface between reversible blade insert 110 and blade base 150) when reversible blade insert 110 is operatively coupled to blade base 150. However, this is not required of all examples of AFP cutter blade assembly 100, and it is additionally within the scope of the present disclosure that reversible blade insert 110 and blade base 150 are not smoothly continuous with one another in this manner. As an example, and as schematically illustrated in dashed lines in FIGS. 1-2, blade base 150 may have a thickness, as measured along a direction parallel to transverse axis 116 (shown in FIG. 1) at a location spaced apart from reversible blade insert 110, that is greater than a combined thickness of blade base 150 and reversible blade insert 110, as measured along a direction parallel to transverse axis 116 at a location where reversible blade insert 110 and blade base 150 are adjacent to one another when reversible blade insert 110 is operatively coupled to blade base 150. In such examples, and as schematically illustrated in FIGS. 1-2, each of reversible blade insert 110 and blade base 150 may be described as including a respective face surface 144, each face surface 144 extending at least substantially in a plane perpendicular to transverse axis 116 (shown in FIG. 1), such that face surface 144 of reversible blade insert 110 is discontinuous with and/or non-coplanar with face surface 144 of blade base 150 when reversible blade insert 110 is operatively coupled to blade base 150. Additionally or alternatively, in such examples, and as further schematically illustrated in FIGS. 1-2, oblique body surface 154 of blade base 150 may extend away from inactive cutting edge 104 when reversible blade insert 110 is operatively coupled to blade base 150 such that reversible blade insert 110 (and/or oblique blade surface 134) covers some, but not all, of oblique body surface 154 when reversible blade insert 110 is operatively coupled to blade base 150.

FIGS. 1-5 generally illustrate each of first cutting edge 122 and second cutting edge 132 as being partially formed by and/or coplanar with a corresponding face surface 144 of reversible blade insert 110. However, this is not required of all examples of reversible blade insert 110, and it is additionally within the scope of the present disclosure that first cutting edge 122 and/or second cutting edge 132 may have any appropriate shape and/or configuration such that first blade body portion 120 terminates in first cutting edge 122 and such that second blade body portion 130 terminates in second cutting edge 132. As an example, one or both of first cutting edge 122 and second cutting edge 132 may be an edge that is not coplanar with the corresponding face surface 144 of reversible blade insert 110 when reversible blade insert 110 is in either of the first cutter blade configuration or the second cutter blade configuration. More specific examples of such configurations may be found in U.S. patent application Ser. No. 15/667,807, the complete disclosure of which is hereby incorporated by reference.

For clarity, FIGS. 1-6 generally illustrate components of AFP cutter blade assembly 100 as featuring sharp and/or well-defined edges and corners. As examples, the intersections of lateral surface 142 and face surface 144 of reversible blade insert 110 (as best shown in FIG. 5) and the perpendicular edges that bound each insert shoulder surface 140 of reversible blade insert 110 (as best shown in FIGS. 3 and 5) are schematically illustrated as occurring at the intersection of mutually perpendicular planar surfaces. However, this is not required of all examples of AFP cutter blade assembly 100, and it is additionally within the scope of the present disclosure that any intersection of substantially planar surfaces (such as of oblique blade surface 134, insert shoulder surface 140, lateral surface 142, face surface 144, oblique body surface 154, blade base end surface 158, and/or any portion of blade insert receiver 152 and/or alignment structure 160) may occur at an edge that is curved, rounded, radiused, beveled, and/or chamfered.

With reference to FIGS. 1-2 and 7, AFP cutter blade assembly 100 and/or blade base 150 further may include components, features, and/or structures for operatively coupling and/or mounting AFP cutter blade assembly 100 to another component. Specifically, in some examples, and as schematically illustrated in FIGS. 1-2 and 7, AFP cutter blade assembly 100 further includes one or more linkage arms 170 pivotally coupled to blade base 150 such that each linkage arm 170 pivots relative to blade base 150 about a blade base pivot axis 172 (shown in FIGS. 1-2). In some such examples, and as further schematically illustrated in FIGS. 1-2 and 7, AFP cutter blade assembly 100 further includes a pivot pin 180 that is operatively coupled to blade base 150 and to each linkage arm 170. In such examples, pivot pin 180 is configured to pivot about blade base pivot axis 172 to enable each linkage arm 170 to pivot relative to blade base 150 about blade base pivot axis 172. In some such examples, pivot pin 180 is fixedly coupled to blade base 150 or to each linkage arm 170. As a more specific example, pivot pin 180 may be welded to blade base 150 such that each linkage arm 170 is not configured to be removed from AFP cutter blade assembly 100 without damage to AFP cutter blade assembly 100.

As discussed, FIG. 7 is a schematic representation of an AFP cutter system 10 that includes a plurality of AFP cutter blade assemblies 100. Specifically, and with reference to FIG. 7, in some examples, AFP cutter system 10 includes a plurality of AFP cutter blade assemblies 100 with each reversible blade insert 110 operatively coupled to the respective blade base 150, such that each AFP cutter blade assembly 100 is operable to cut a respective fiber tow 40. In such examples, AFP cutter system 10 further includes an actuator assembly 30 configured to selectively translate active cutting edge 102 of reversible blade insert 110 of each AFP cutter blade assembly 100 toward the respective fiber tow 40 to selectively cut the respective fiber tow 40.

AFP cutter system 10 and/or actuator assembly 30 may be configured to selectively translate each AFP cutter blade assembly 100 in any appropriate manner. In some examples, and as schematically illustrated in FIG. 7, AFP cutter system 10 further includes an anvil 20, and actuator assembly 30 includes a plurality of yokes 32 such that each yoke 32 is pivotally coupled to linkage arm(s) 170 of a corresponding AFP cutter blade assembly 100. In such examples, AFP cutter system 10 is configured such that selectively urging each yoke 32 toward anvil 20 with actuator assembly 30 operates to translate active cutting edge 102 of reversible blade insert 110 of the corresponding AFP cutter blade assembly 100 toward the respective fiber tow 40 to cut the respective fiber tow 40.

The plurality of AFP cutter blade assemblies 100 of AFP cutter system 10 may have any appropriate arrangement. As an example, and as schematically illustrated in FIG. 7, the plurality of AFP cutter blade assemblies 100 may be configured such that insert planes 118 of the respective reversible blade inserts 110 of the plurality of AFP cutter blade assemblies 100 are at least substantially coplanar. Additionally or alternatively, in some examples, the plurality of AFP cutter blade assemblies 100 are configured such that lateral surfaces 142 of each pair of adjacent AFP cutter blade assemblies 100 are positioned adjacent to one another in a close-fit arrangement. In such examples, it may be desirable that lateral surface 142 of each AFP cutter blade assembly 100 is at least substantially smoothly continuous, such as to prevent mechanical interference between adjacent AFP cutter blade assemblies 100 during operative use of AFP cutter system 10.

Figure 8:
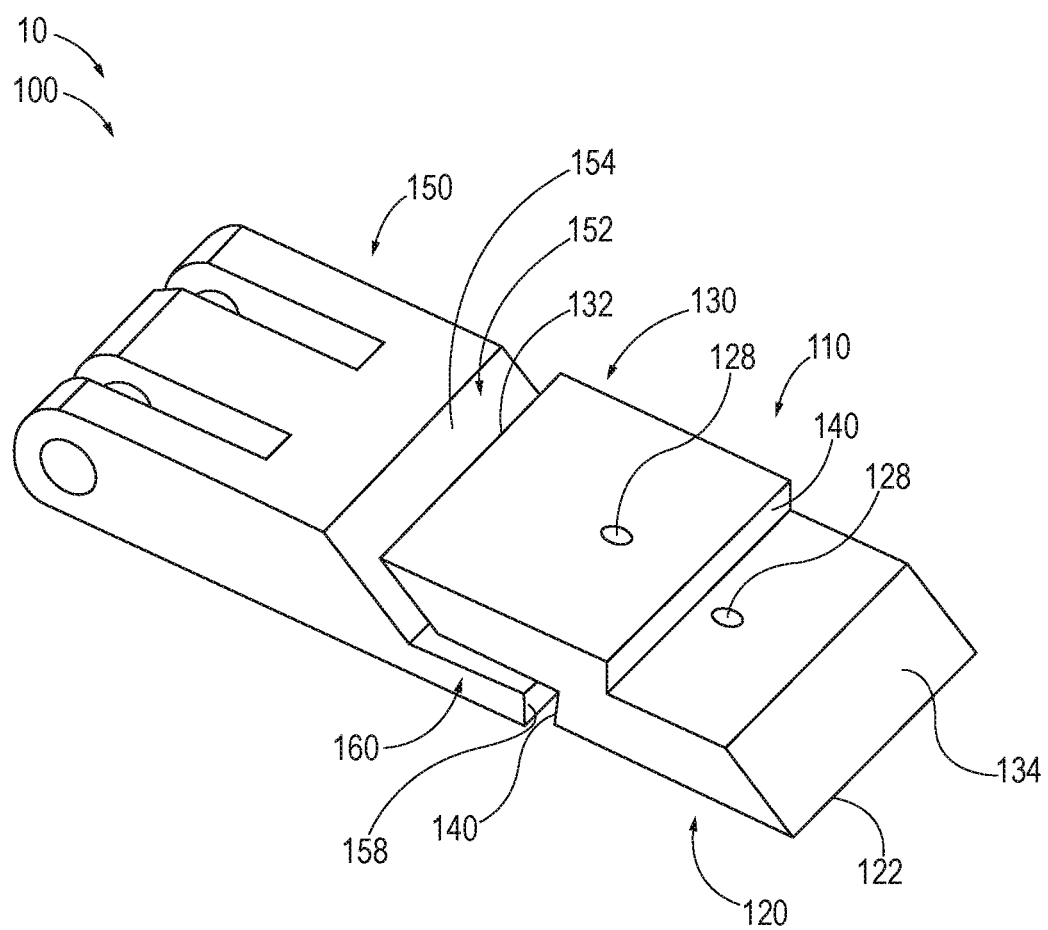
FIG. 8 is a front side isometric view representing an example of an AFP cutter blade assembly according to the present disclosure.

Turning now to FIG. 8, FIG. 8 is a less schematic illustration of components of an example of AFP cutter blade assembly 100, such as may be utilized as a component of AFP cutter system 10 when operatively coupled to one another to form an assembled AFP cutter blade assembly 100 as described herein. Specifically, FIG. 8 illustrates an example of AFP cutter blade assembly 100 in which reversible blade insert 110 is not operatively coupled to blade base 150. In the example of FIG. 8, reversible blade insert 110 includes first blade body portion 120 and second blade body portion 130 that are monolithic, integrally formed, and coextensive with one another. Additionally, in the example of FIG. 8, each of first blade body portion 120 and second blade body portion 130 defines a single insert fastener receiver 128. Moreover, in the example of FIG. 8, blade base 150 includes blade insert receiver 152 that includes oblique body surface 154 that extends adjacent to oblique blade surface 134 of first blade body portion 120 or of second blade body portion 130 when reversible blade insert 110 is operatively coupled to blade base 150.

Figure 9:
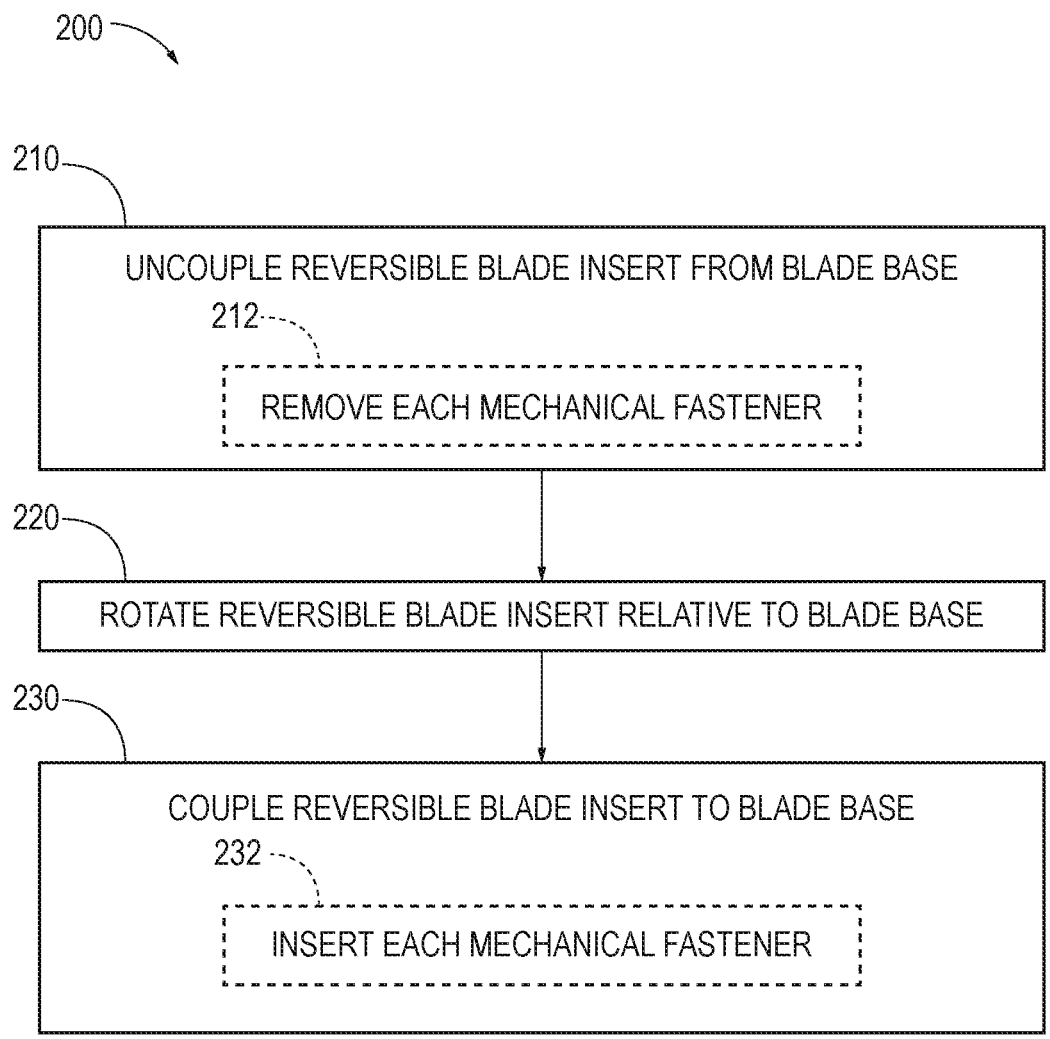
FIG. 9 is a flowchart depicting methods of reconfiguring a reversible blade insert of an AFP cutter blade assembly according to the present disclosure.

FIG. 9 is a flowchart depicting methods 200, according to the present disclosure, of reconfiguring a reversible blade insert (such as reversible blade insert 110) of an AFP cutter blade assembly (such as AFP cutter blade assembly 100) that is operatively coupled to a blade base (such as blade base 150) of the AFP cutter blade assembly. Methods 200 generally pertain to examples in which the reversible blade includes a first cutting edge (such as first cutting edge 122) and a second cutting edge (such as second cutting edge 132), and in which one of the first cutting edge and the second cutting edge is an initially active cutting edge (such as active cutting edge 102) that is exposed and the other of the first cutting edge and the second cutting edge is an initially inactive cutting edge (such as inactive cutting edge 104) that is at least partially disabled by the blade base.

As shown in FIG. 9, method 200 includes uncoupling, at 210, the reversible blade insert from the blade base; rotating, at 220, the reversible blade insert relative to the blade base to expose the initially inactive cutting edge; and operatively coupling, at 230, the reversible blade insert to the blade base. Specifically, the operatively coupling the reversible blade insert to the blade base at 230 includes coupling the reversible blade insert to the blade base such that the initially inactive cutting edge is a finally active cutting edge that is exposed and such that the initially active cutting edge is a finally active cutting edge that is at least partially disabled by the blade base. In this manner, method 200 may be described as a method of transitioning reversible blade insert 110 from the first cutter blade configuration to the second cutter blade configuration or from the second cutter blade configuration to the first cutter blade configuration.

The uncoupling the reversible blade insert from the blade base at 210 and/or the operatively coupling the reversible blade insert to the blade base at 230 may be performed in any appropriate manner. In some examples, the reversible blade insert includes a first blade body portion (such as first blade body portion 120) that terminates in the first cutting edge and a second blade body portion (such as second blade body portion 130) that terminates in the second cutting edge, each of which defines one or more insert fastener receivers (such as insert fastener receivers 128) operable to receive corresponding mechanical fasteners (such as mechanical fasteners 106). In some such examples, and as shown in FIG. 9, the uncoupling at 210 includes removing at 212, each mechanical fastener from a respective insert fastener receiver of one of the first blade body portion and the second blade body portion, and the operatively coupling the reversible blade insert to the blade base at 230 includes inserting, at 232, each mechanical fastener into a respective insert fastener receiver of the other of the first blade body portion and the second blade body portion.

Illustrative, non-exclusive examples of inventive subject matter according to the present disclosure are described in the following enumerated paragraphs:

A1. An automated fiber placement (AFP) cutter blade assembly (100), comprising:

a blade base (150); and a reversible blade insert (110) having a first blade body portion (120) that terminates in a first cutting edge (122) and a second blade body portion (130) that terminates in a second cutting edge (132);

wherein the reversible blade insert (110) is configured to be selectively and operatively coupled to the blade base (150) in either of:

(i) a first cutter blade configuration, in which the first cutting edge (122) is an active cutting edge (102) that is exposed and operable to cut fiber tows (40) and the second cutting edge (132) is an inactive cutting edge (104) that is at least partially disabled from cutting fiber tows (40) by the blade base (150); and (ii) a second cutter blade configuration, in which the second cutting edge (132) is the active cutting edge (102) and the first cutting edge (122) is the inactive cutting edge (104).

A2. The AFP cutter blade assembly (100) of paragraph A1, wherein the first blade body portion (120) and the second blade body portion (130) are one or more of monolithic, integrally formed, and coextensive.

A3. The AFP cutter blade assembly (100) of paragraph A1, wherein the first blade body portion (120) and the second blade body portion (130) are distinct components that are operatively coupled to one another.

A4. The AFP cutter blade assembly (100) of paragraph A3, wherein the first blade body portion (120) and the second blade body portion (130) are operatively coupled to one another via one or more of welding, brazing, an adhesive, and a mechanical fastener.

A5. The AFP cutter blade assembly (100) of any of paragraphs A3-A4, wherein the first blade body portion (120) and the second blade body portion (130) are directly coupled to one another.

A6. The AFP cutter blade assembly (100) of any of paragraphs A3-A4, wherein the first blade body portion (120) and the second blade body portion (130) are indirectly coupled to one another.

A7. The AFP cutter blade assembly (100) of any of paragraphs A1-A6, wherein the reversible blade insert (110) includes a longitudinal axis (114) that extends between the first cutting edge (122) and the second cutting edge (132) and a lateral axis (112) that extends perpendicular to the longitudinal axis (114).

A8. The AFP cutter blade assembly (100) of paragraph A7, wherein the reversible blade insert (110) is at least substantially rotationally symmetric about the lateral axis (112).

A9. The AFP cutter blade assembly (100) of any of paragraphs A7-A8, wherein the reversible blade insert (110) is at least substantially symmetric about the longitudinal axis (114).

A10. The AFP cutter blade assembly (100) of any of paragraphs A7-A9, wherein the lateral axis (112) and the longitudinal axis (114) define an insert plane (118) of the reversible blade insert (110) that extends parallel to each of the lateral axis (112) and the longitudinal axis (114).

A11. The AFP cutter blade assembly (100) of paragraph A10, wherein the reversible blade insert (110) extends at least substantially within the insert plane (118)

A12. The AFP cutter blade assembly (100) of any of paragraphs A10-A11, wherein each of the first cutting edge (122) and the second cutting edge (132) extends at least substantially parallel to the insert plane (118).

A13. The AFP cutter blade assembly (100) of any of paragraphs A7-A12, wherein the reversible blade insert (110) further includes a transverse axis (116) that extends perpendicular to each of the lateral axis (112) and the longitudinal axis (114).

A14. The AFP cutter blade assembly (100) of paragraph A13, wherein the transverse axis (116) extends perpendicular to a/the insert plane (118).

A15. The AFP cutter blade assembly (100) of any of paragraphs A1-A14, wherein the first cutting edge (122) and the second cutting edge (132) are at least substantially identical in shape.

A16. The AFP cutter blade assembly (100) of any of paragraphs A1-A14, wherein the first cutting edge (122) and the second cutting edge (132) have distinct shapes.

A17. The AFP cutter blade assembly (100) of any of paragraphs A1-A16, wherein each of the first blade body portion (120) and the second blade body portion (130) includes an oblique blade surface (134); wherein the oblique blade surface (134) of the first blade body portion (120) partially defines the first cutting edge (122); and wherein the oblique blade surface (134) of the second blade body portion (130) partially defines the second cutting edge (132).

A18. The AFP cutter blade assembly (100) of paragraph A17, wherein each oblique blade surface (134) extends oblique to a/the insert plane (118) of the reversible blade insert (110).

A19. The AFP cutter blade assembly (100) of any of paragraphs A1-A18, wherein one or both of the first cutting edge (122) and the second cutting edge (132) has a cutting edge internal angle (124), as measured through a plane perpendicular to a/the lateral axis (112), that is one or more of at least 5 degrees, at least 10 degrees, at least 15 degrees, at least 20 degrees, at least 25 degrees, at most 30 degrees, at most 22 degrees, at most 17 degrees, at most 12 degrees, and at most 7 degrees.

A20. The AFP cutter blade assembly (100) of paragraph A19, wherein the cutting edge internal angle (124) of the first cutting edge (122) is at least substantially identical to the cutting edge internal angle (124) of the second cutting edge (132).

A21. The AFP cutter blade assembly (100) of paragraph A19, wherein the cutting edge internal angle (124) of the first cutting edge (122) is distinct from the cutting edge internal angle (124) of the second cutting edge (132).

A22. The AFP cutter blade assembly (100) of any of paragraphs A1-A21, wherein one or both of the first cutting edge (122) and the second cutting edge (132) has a cutting edge bias angle (126), as measured from a direction parallel to a/the lateral axis (112) and through a plane parallel to a/the insert plane (118), that is one or more of 0 degrees, at least 5 degrees, at least 10 degrees, at least 20 degrees, at least 30 degrees, at least 40 degrees, at least 50 degrees, at most 60 degrees, at most 45 degrees, at most 35 degrees, at most 25 degrees, at most 15 degrees, at most 7 degrees, and at most 2 degrees.

A23. The AFP cutter blade assembly (100) of paragraph A22, wherein the cutting edge bias angle (126) of the first cutting edge (122) is at least substantially identical to the cutting edge bias angle (126) of the second cutting edge (132).

A24. The AFP cutter blade assembly (100) of paragraph A22, wherein the cutting edge bias angle (126) of the first cutting edge (122) is distinct from the cutting edge bias angle (126) of the second cutting edge (132).

A25. The AFP cutter blade assembly (100) of any of paragraphs A1-A24, wherein one or both of the first cutting edge (122) and the second cutting edge (132) is a chiseled cutting edge.

A26. The AFP cutter blade assembly (100) of any of paragraphs A1-A25, wherein one or both of the first cutting edge (122) and the second cutting edge (132) is a guillotine blade.

A27. The AFP cutter blade assembly (100) of any of paragraphs A1-A26, wherein the reversible blade insert (110) is configured to be operatively coupled to the blade base (150) by one or more mechanical fasteners (106).

A28. The AFP cutter blade assembly (100) of paragraph A27, wherein each of the first blade body portion (120) and the second blade body portion (130) defines one or more insert fastener receivers (128) operable to receive a corresponding mechanical fastener (106) of the one or more mechanical fasteners (106) to operatively couple the reversible blade insert (110) to the blade base (150).

A29. The AFP cutter blade assembly (100) of paragraph A28, wherein each insert fastener receiver (128) is a hole that extends fully through the reversible blade insert (110) along a direction at least substantially parallel to a/the transverse axis (116).

A30. The AFP cutter blade assembly (100) of any of paragraphs A28-A29, wherein each insert fastener receiver (128) is a threaded insert fastener receiver (128).

A31. The AFP cutter blade assembly (100) of any of paragraphs A28-A29, wherein each insert fastener receiver (128) is a smooth-bored insert fastener receiver (128).

A32. The AFP cutter blade assembly (100) of any of paragraphs A28-A31, wherein each insert fastener receiver (128) is a countersunk insert fastener receiver (128).

A33. The AFP cutter blade assembly (100) of any of paragraphs A28-A32, wherein the one or more insert fastener receivers (128) of each of the first blade body portion (120) and the second blade body portion (130) consists of one of:
  (i) one insert fastener receiver (128);
  (ii) two insert fastener receivers (128);
  (iii) three insert fastener receivers (128); or
  (iv) more than three insert fastener receivers (128).

A34. The AFP cutter blade assembly (100) of any of paragraphs A28-A33, wherein the one or more insert fastener receivers (128) of each of the first blade body portion (120) and the second blade body portion (130) consists of a plurality of insert fastener receivers (128) that are spaced apart along a direction parallel to a/the lateral axis (112).

A35. The AFP cutter blade assembly (100) of any of paragraphs A27-A34, wherein the blade base (150) defines one or more base fastener receivers (156) operable to receive a corresponding mechanical fastener (106) of a/the one or more mechanical fasteners (106) to operatively couple the reversible blade insert (110) to the blade base (150).

A36. The AFP cutter blade assembly (100) of paragraph A35, wherein each base fastener receiver (156) is a hole that extends fully through the blade base (150) along a direction at least substantially parallel to a/the transverse axis (116) of the reversible blade insert (110) when the reversible blade insert (110) is operatively coupled to the blade base (150).

A37. The AFP cutter blade assembly (100) of any of paragraphs A35-A36, wherein each base fastener receiver (156) is a threaded base fastener receiver (156).

A38. The AFP cutter blade assembly (100) of any of paragraphs A35-A36, wherein each base fastener receiver (156) is a smooth-bored base fastener receiver (156).

A39. The AFP cutter blade assembly (100) of any of paragraphs A35-A38, wherein each base fastener receiver (156) is a countersunk base fastener receiver (156).

A40. The AFP cutter blade assembly (100) of any of paragraphs A35-A39, wherein the one or more base fastener receivers (156) consists of one of:
  (i) one base fastener receiver (156);
  (ii) two base fastener receivers (156);
  (iii) three base fastener receivers (156); or
  (iv) more than three base insert fastener receivers (156).

A41. The AFP cutter blade assembly (100) of any of paragraphs A1-A40, wherein the reversible blade insert (110) is configured to be operatively coupled to the blade base (150) at least partially by a non-mechanical fastening mechanism, optionally by a magnetic fastening mechanism.

A42. The AFP cutter blade assembly (100) of any of paragraphs A1-A41, further comprising an alignment structure (160) configured to maintain the reversible blade insert (110) and the blade base (150) in static engagement with one another when the reversible blade insert (110) is operatively coupled to the blade base (150); wherein one or both of the reversible blade insert (110) and the blade base (150) includes at least a portion of the alignment structure (160).

A43. The AFP cutter blade assembly (100) of paragraph A42, wherein the alignment structure (160) includes one or more components of each of the reversible blade insert (110) and the blade base (150) that are configured to mechanically interlock in a close-fit arrangement with one another when the reversible blade insert (110) is operatively coupled to the blade base (150).

A44. The AFP cutter blade assembly (100) of any of paragraphs A42-A43, wherein the alignment structure (160) is configured to guide the reversible blade insert (110) into alignment with the blade base (150) as the reversible blade insert (110) is approaches either of the first cutter blade configuration and the second cutter blade configuration.

A45. The AFP cutter blade assembly (100) of any of paragraphs A42-A44, wherein the alignment structure (160) is configured to prevent the reversible blade insert (110) from pivoting with respect to the blade base (150) while the reversible blade insert (110) is operatively coupled to the blade base (150).

A46. The AFP cutter blade assembly (100) of any of paragraphs A42-A45, wherein the alignment structure (160) is configured to prevent the reversible blade insert (110) from translating with respect to the blade base (150) along one or more directions while the reversible blade insert (110) is operatively coupled to the blade base (150).

A47. The AFP cutter blade assembly (100) of any of paragraphs A42-A46, wherein the blade base (150) includes a blade base end surface (158) that is at least substantially flat; wherein each of the first blade body portion (120) and the second blade body portion (130) defines a respective insert shoulder surface (140) that engages the blade base end surface (158) when the reversible blade insert (110) is operatively coupled to the blade base (150) to restrict the reversible blade insert (110) from pivoting relative to the blade base (150); wherein the alignment structure (160) includes each insert shoulder surface (140).

A48. The AFP cutter blade assembly (100) of paragraph A47, wherein the insert shoulder surface (140) and the blade base end surface (158) are at least substantially parallel to one another when the reversible blade insert (110) is operatively coupled to the blade base (150).

A49. The AFP cutter blade assembly (100) of any of paragraphs A47-A48, wherein the alignment structure (160) includes the blade base end surface (158).

A50. The AFP cutter blade assembly (100) of any of paragraphs A47-A49, wherein the insert shoulder surface (140) of the first blade body portion (120) engages the blade base end surface (158) when the reversible blade insert (110) is in the first cutter blade configuration, and wherein the insert shoulder surface (140) of the second blade body portion (130) engages the blade base end surface (158) when the reversible blade insert (110) is in the second cutter blade configuration.

A51. The AFP cutter blade assembly (100) of any of paragraphs A47-A50, wherein each insert shoulder surface (140) extends at least substantially perpendicular to a/the longitudinal axis (114).

A52. The AFP cutter blade assembly (100) of any of paragraphs A1-A51, wherein the blade base (150) includes a blade insert receiver (152) that receives the reversible blade insert (110) when the reversible blade insert (110) is operatively coupled to the blade base (150).

A53. The AFP cutter blade assembly (100) of paragraph A52, when dependent from paragraph A42, wherein the alignment structure (160) includes at least a portion of the blade insert receiver (152).

A54. The AFP cutter blade assembly (100) of any of paragraphs A52-A53, wherein the blade insert receiver (152) includes, and optionally is, one or more surfaces of the blade base (150).

A55. The AFP cutter blade assembly (100) of paragraph A54, wherein the blade insert receiver (152) includes a/the blade base end surface (158).

A56. The AFP cutter blade assembly (100) of any of paragraphs A52-A55, wherein the blade insert receiver (152) at least partially conforms to the inactive cutting edge (104) to disable the inactive cutting edge (104) from cutting fiber tows (40) while the reversible blade insert (110) is operatively coupled to the blade base (150).

A57. The AFP cutter blade assembly (100) of any of paragraphs A52-A56, wherein the blade insert receiver (152) includes an oblique body surface (154) that extends at least substantially adjacent to the inactive cutting edge (104) when the reversible blade insert (110) is operatively coupled to the blade base (150).

A58. The AFP cutter blade assembly (100) of paragraph A57, wherein a/the alignment structure (160) includes the oblique body surface (154).

A59. The AFP cutter blade assembly (100) of any of paragraphs A52-A58, wherein the blade insert receiver (152) includes at least one surface of the blade base (150), optionally a/the oblique body surface (154), that faces at least substantially the same direction as a/the oblique blade surface (134) that partially defines the active cutting edge (102) when the reversible blade insert (110) is operatively coupled to the blade base (150).

A60. The AFP cutter blade assembly (100) of any of paragraphs A1-A59, further comprising a lateral surface (142) that is at least substantially smoothly continuous when the reversible blade insert (110) is operatively coupled to the blade base (150) in either of the first cutter blade configuration and the second cutter blade configuration, wherein each of the reversible blade insert (110) and the blade base (150) forms a portion of the lateral surface (142).

A61. The AFP cutter blade assembly (100) of any of paragraphs A1-A60, further comprising a face surface (144) that is at least substantially smoothly continuous when the reversible blade insert (110) is operatively coupled to the blade base (150) in either of the first cutter blade configuration and the second cutter blade configuration, wherein each of the reversible blade insert (110) and the blade base (150) forms a portion of the face surface (144).

A62. The AFP cutter blade assembly (100) of any of paragraphs A1-A60, wherein each of the reversible blade insert (110) and the blade base (150) includes a respective face surface (144) extending at least substantially in a plane that is perpendicular to a/the transverse axis (116) when the reversible blade insert (110) is operatively coupled to the blade base (150); wherein the face surface (144) of the reversible blade insert (110) is one or both of discontinuous with the face surface (144) of the blade base (150) and non-coplanar with the face surface (144) of the blade base (150) when the reversible blade insert (110) is operatively coupled to the blade base (150) in either of the first cutter blade configuration and the second cutter blade configuration.

A63. The AFP cutter blade assembly (100) of paragraph A62, wherein, when the reversible blade insert (110) is operatively coupled to the blade base (150) in either of the first cutter blade configuration and the second cutter blade configuration, the blade base (150) has a thickness, as measured along a direction parallel to the transverse axis (116) and at a location that is spaced apart from the reversible blade insert (110), that is greater than a combined thickness of the blade base (150) and the reversible blade insert (110), as measured along a direction parallel to the transverse axis (116) at a location where the reversible blade insert (110) and the blade base (150) are adjacent to one another.

A64. The AFP cutter blade assembly (100) of any of paragraphs A62-A63, wherein the reversible blade insert (110) covers some, but not all, of a/the oblique body surface (154) when the reversible blade insert (110) is operatively coupled to the blade base (150) in either of the first cutter blade configuration and the second cutter blade configuration.

A65. The AFP cutter blade assembly (100) of any of paragraphs A1-A64, further comprising one or more linkage arms (170) pivotally coupled to the blade base (150), wherein each linkage arm (170) of the one or more linkage arms (170) is configured to pivot relative to the blade base (150) about a blade base pivot axis (172).

A66. The AFP cutter blade assembly (100) of paragraph A65, further comprising a pivot pin (180) that is operatively coupled to each of the blade base (150) and the one or more linkage arms (170); wherein the pivot pin (180) is configured to pivot about the blade base pivot axis (172) to enable each linkage arm (170) of the one or more linkage arms (170) to pivot relative to the blade base (150).

A67. The AFP cutter blade assembly (100) of paragraph A66, wherein the pivot pin (180) is fixedly coupled to one of:
 (i) the blade base (150); and
 (ii) the one or more linkage arms (170).

A68. The AFP cutter blade assembly (100) of paragraph A67, wherein the pivot pin (180) is welded to the blade base (150).

A69. The AFP cutter blade assembly (100) of any of paragraphs A1-A68, wherein each of the first cutting edge (122) and the second cutting edge (132) is configured to cut a fiber tow (40) that includes one or more of a carbon fiber and a prepreg fiber.

A70. The AFP cutter blade assembly (100) of any of paragraphs A1-A69, wherein the reversible blade insert (110) is formed of one or more of metal, a steel, D2 tool steel, and carbide.

A71. The AFP cutter blade assembly (100) of any of paragraphs A1-A70, wherein the blade base (150) is formed of one or more of metal, a steel, D2 tool steel, and carbide.

B1. An automated fiber placement (AFP) cutter system (10), comprising:

a plurality of instances of the AFP cutter blade assembly (100) of any of paragraphs A1-A71 with the reversible blade insert (110) operatively coupled to the blade base (150); and an actuator assembly (30) configured to selectively translate the active cutting edge (102) of the reversible blade insert (110) of each AFP cutter blade assembly (100) toward a respective fiber tow (40) to selectively cut the respective fiber tow (40).

B2. The AFP cutter system (10) of paragraph B1, further comprising an anvil (20); wherein the actuator assembly (30) includes a plurality of yokes (32) corresponding to the plurality of AFP cutter blade assemblies (100), each yoke (32) pivotally coupled to the corresponding one or more linkage arms (170) of the corresponding AFP cutter blade assembly (100); wherein the AFP cutter system (10) is configured such that selectively urging each yoke (32) toward the anvil (20) with the actuator assembly (30) operates to translate the active cutting edge (102) of the reversible blade insert (110) of the corresponding AFP cutter blade assembly (100) toward the respective fiber tow (40).

B3. The AFP cutter system (10) of any of paragraphs B1-B2, wherein the plurality of AFP cutter blade assemblies (100) are configured such that a/the insert planes (118) of the reversible blade inserts (110) of the plurality of AFP cutter blade assemblies (100) are at least substantially coplanar.

B4. The AFP cutter system (10) of any of paragraphs B1-B3, wherein the plurality of AFP cutter blade assemblies (100) are configured such that a/the lateral surfaces (142) of each pair of adjacent AFP cutter blade assemblies (100) of the plurality of AFP cutter blade assemblies (100) are positioned adjacent to one another in a close-fit arrangement.

C1. A method (200) of reconfiguring a reversible blade insert (110) of an automated fiber placement (AFP) cutter blade assembly (100) that is operatively coupled to a blade base (150) of the AFP cutter blade assembly (100), wherein the reversible blade insert (110) includes a first cutting edge (122) and a second cutting edge (132), wherein one of the first cutting edge (122) and the second cutting edge (132) is an initially active cutting edge (102) that is exposed, wherein the other of the first cutting edge (122) and the second cutting edge (132) is an initially inactive cutting edge (104) that is at least partially disabled by the blade base (150); the method (200) comprising:

uncoupling (210) the reversible blade insert (110) from the blade base (150);

rotating (220) the reversible blade insert (110) relative to the blade base (150) to expose the initially inactive cutting edge (104); and operatively coupling (230) the reversible blade insert (110) to the blade base (150) such that the initially inactive cutting edge (104) is a finally active cutting edge (102) that is exposed and such that the initially active cutting edge (102) is a finally inactive cutting edge (104) that is at least partially disabled by the blade base (150).

C2. The method (200) of paragraph C1, wherein the reversible blade insert (110) includes a first blade body portion (120) that terminates in the first cutting edge (122) and a second blade body portion (130) that terminates in the second cutting edge (132); wherein each of the first blade body portion (120) and the second blade body portion (130) defines one or more insert fastener receivers (128) operable to receive a corresponding mechanical fastener (106) of one or more mechanical fasteners (106); wherein the uncoupling (210) the reversible blade insert (110) from the blade base (150) includes removing (212) each of the one or more mechanical fasteners (106) from a respective insert fastener receiver (128) of one of the first blade body portion (120) and the second blade body portion (130); and wherein the operatively coupling (230) the reversible blade insert (110) to the blade base (150) includes inserting (232) each of the one or more mechanical fasteners (106) into a respective insert fastener receiver (128) of the other of the first blade body portion (120) and the second blade body portion (130).

C3. The method (200) of any of paragraphs C1-C2, wherein the AFP cutter blade assembly (100) is the AFP cutter blade assembly (100) of any of paragraphs A1-A71.

As used herein, the phrase "at least substantially," when modifying a degree or relationship, includes not only the recited "substantial" degree or relationship, but also the full extent of the recited degree or relationship. A substantial amount of a recited degree or relationship may include at least 75% of the recited degree or relationship. For example, a first direction that is at least substantially parallel to a second direction includes a first direction that is within an angular deviation of 22.5° relative to the second direction and also includes a first direction that is identical to the second direction.

As used herein, the terms "selective" and "selectively," when modifying an action, movement, configuration, or other activity of one or more components or characteristics of an apparatus, mean that the specific action, movement, configuration, or other activity is a direct or indirect result of one or more dynamic processes, as described herein. The terms "selective" and "selectively" thus may characterize an activity that is a direct or indirect result of user manipulation of an aspect of, or one or more components of, the apparatus, or may characterize a process that occurs automatically, such as via the mechanisms disclosed herein.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the term "and/or" placed between a first entity and a second entity means one of (1) the first entity, (2) the second entity, and (3) the first entity and the second entity. Multiple entries listed with "and/or" should be construed in the same manner, i.e., "one or more" of the entities so conjoined. Other entities optionally may be present other than the entities specifically identified by the "and/or" clause, whether related or unrelated to those entities specifically identified. Thus, as a non-limiting example, a reference to "A and/or B," when used in conjunction with open-ended language such as "comprising," may refer, in one example, to A only (optionally including entities other than B); in another example, to B only (optionally including entities other than A); in yet another example, to both A and B (optionally including other entities). These entities may refer to elements, actions, structures, steps, operations, values, and the like.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the phrase "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

In the present disclosure, several of the illustrative, non-exclusive examples have been discussed and/or presented in the context of flow diagrams, or flow charts, in which the methods are shown and described as a series of blocks, or steps. Unless specifically set forth in the accompanying description, it is within the scope of the present disclosure that the order of the blocks may vary from the illustrated order in the flow diagram, including with two or more of the blocks (or steps) occurring in a different order, concurrently, and/or repeatedly. It is also within the scope of the present disclosure that the blocks, or steps, may be implemented as logic, which also may be described as implementing the blocks, or steps, as logics. In some applications, the blocks, or steps, may represent expressions and/or actions to be performed by functionally equivalent circuits or other logic devices. The illustrated blocks may, but are not required to, represent executable instructions that cause a computer, processor, and/or other logic device to respond, to perform an action, to change states, to generate an output or display, and/or to make decisions.

In the event that any patents, patent applications, or other references are incorporated by reference herein and (1) define a term in a manner that is inconsistent with and/or (2) are otherwise inconsistent with, either the non-incorporated portion of the present disclosure or any of the other incorporated references, the non-incorporated portion of the present disclosure shall control, and the term or incorporated disclosure therein shall only control with respect to the reference in which the term is defined and/or the incorporated disclosure was present originally.

The various disclosed elements of apparatuses and systems and steps of methods disclosed herein are not required to all apparatuses, systems, and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus, system, or method. Accordingly, such inventive subject matter is not required to be associated with the specific apparatuses, systems, and methods that are expressly disclosed herein and such inventive subject matter may find utility in apparatuses, systems, and/or methods that are not expressly disclosed herein.

The invention claimed is:

1. A method of reconfiguring a reversible blade insert of an automated fiber placement (AFP) cutter blade assembly that is operatively coupled to a blade base of the AFP cutter blade assembly, wherein the reversible blade insert includes a first blade body portion terminating in a first cutting edge and a second blade body portion terminating in a second cutting edge, wherein each of the first blade body portion and the second blade body portion comprise a respective insert shoulder surface that is configured to engage an at least substantially flat blade base end surface of the blade base, wherein one of the first cutting edge and the second cutting edge is an initially active cutting edge that is exposed, wherein the other of the first cutting edge and the second cutting edge is an initially inactive cutting edge that is at least partially disabled by the blade base; the method comprising:

uncoupling the reversible blade insert from the blade base, wherein the blade base is pivotally coupled to one or more linkage arms, and wherein each linkage arm is configured to pivot relative to the blade base about a blade base pivot axis;

rotating the reversible blade insert relative to the blade base to expose the initially inactive cutting edge;

operatively coupling the reversible blade insert to the blade base such that the initially inactive cutting edge is a finally active cutting edge that is exposed, such that the initially active cutting edge is a finally inactive cutting edge that is at least partially disabled by the blade base, and such that the AFP cutter blade assembly comprises a pair of lateral surfaces that are at least substantially smooth and continuous with each of the blade base and the reversible blade insert forming a portion of each lateral surface of the pair of lateral surfaces; and wherein the operatively coupling comprises supporting the insert shoulder surface corresponding to the finally active cutting edge on the blade base end surface such that the finally active cutting edge extends at a cutting edge bias angle of at least 5 degrees relative to the blade base end surface.

2. The method of claim 1, wherein the reversible blade insert includes a first blade body portion that includes the first cutting edge and a second blade body portion that includes the second cutting edge; wherein each of the first blade body portion and the second blade body portion defines one or more insert fastener receivers operable to receive a corresponding mechanical fastener of one or more mechanical fasteners; wherein the uncoupling the reversible blade insert from the blade base includes removing each of the one or more mechanical fasteners from a respective insert fastener receiver of one of the first blade body portion and the second blade body portion; and wherein the operatively coupling the reversible blade insert to the blade base includes inserting each of the one or more mechanical fasteners into a respective insert fastener receiver of the other of the first blade body portion and the second blade body portion.

3. An automated fiber placement (AFP) cutter blade assembly, comprising:
a blade base;
one or more linkage arms pivotally coupled to the blade base wherein each linkage arm is configured to pivot relative to the blade base about a blade base pivot axis; and
a reversible blade insert having a first blade body portion that terminates in a first cutting edge and a second blade body portion that terminates in a second cutting edge; wherein the reversible blade insert selectively and operatively couples to the blade base in either of:
(i) a first cutter blade configuration, in which the first cutting edge is an active cutting edge that is exposed and operable to cut fiber tows and the second cutting edge is an inactive cutting edge that is at least partially disabled from cutting fiber tows by the blade base; and
(ii) a second cutter blade configuration, in which the second cutting edge is the active cutting edge and the first cutting edge is the inactive cutting edge;
wherein the blade base includes a blade base end surface that is at least substantially flat; wherein each of the first blade body portion and the second blade body portion defines a respective insert shoulder surface that engages the blade base end surface when the reversible blade insert is operatively coupled to the blade base to restrict the reversible blade insert from pivoting relative to the blade base, wherein the active cutting edge extends at a cutting edge bias angle relative to the insert shoulder surface, and wherein the cutting edge bias angle is at least 5 degrees; and
wherein the AFP cutter blade assembly comprises a pair of lateral surfaces, wherein each lateral surface of the pair of lateral surfaces is at least substantially smooth and continuous, and wherein each of the reversible blade insert and the blade base forms a portion of each lateral surface of the pair of lateral surfaces.

4. The AFP cutter blade assembly of claim 3, wherein the first blade body portion and the second blade body portion are one or more of monolithic, integrally formed, and coextensive.

5. The AFP cutter blade assembly of claim 3, wherein the reversible blade insert includes a longitudinal axis that extends between the first cutting edge and the second cutting edge and a lateral axis that extends perpendicular to the longitudinal axis; and wherein the reversible blade insert is at least substantially rotationally symmetric about the lateral axis.

6. The AFP cutter blade assembly of claim 3, wherein the first cutting edge and the second cutting edge are at least substantially identical in shape.

7. The AFP cutter blade assembly of claim 3, wherein the reversible blade insert operatively couples to the blade base by one or more mechanical fasteners; wherein each of the first blade body portion and the second blade body portion defines one or more insert fastener receivers that each receive a corresponding mechanical fastener of the one or more mechanical fasteners to operatively couple the reversible blade insert to the blade base; and wherein the blade base defines one or more base fastener receivers that each receive a corresponding mechanical fastener of the one or more mechanical fasteners to operatively couple the reversible blade insert to the blade base.

8. The AFP cutter blade assembly of claim 7, wherein the reversible blade insert includes a longitudinal axis that extends between the first cutting edge and the second cutting edge and a lateral axis that extends perpendicular to the longitudinal axis; and wherein the one or more insert fastener receivers of each of the first blade body portion and the second blade body portion includes a plurality of insert fastener receivers that are spaced apart along a direction parallel to the lateral axis.

9. The AFP cutter blade assembly of claim 3, further comprising an alignment structure that maintains the reversible blade insert and the blade base in static engagement with one another when the reversible blade insert is operatively coupled to the blade base; wherein one or both of the reversible blade insert and the blade base includes at least a portion of the alignment structure.

10. The AFP cutter blade assembly of claim 9, wherein the alignment structure includes each insert shoulder surface.

11. The AFP cutter blade assembly of claim 10, wherein the insert shoulder surface of the first blade body portion engages the blade base end surface when the reversible blade insert is in the first cutter blade configuration, and wherein the insert shoulder surface of the second blade body portion engages the blade base end surface when the reversible blade insert is in the second cutter blade configuration.

12. The AFP cutter blade assembly of claim 3, wherein the blade base includes a blade insert receiver that receives the reversible blade insert in either of the first cutter blade configuration and the second cutter blade configuration; and wherein the blade insert receiver includes an oblique body surface that extends at least substantially adjacent to the inactive cutting.

13. The AFP cutter blade assembly of claim 12, wherein each of the first cutting edge and the second cutting edge extends at least substantially parallel to an insert plane of the reversible blade insert; wherein each of the first blade body portion and the second blade body portion includes an oblique blade surface; wherein the oblique blade surface of the first blade body portion partially defines the first cutting edge; wherein the oblique blade surface of the second blade body portion partially defines the second cutting edge; wherein each oblique blade surface extends oblique to the insert plane of the reversible blade insert; and wherein the oblique body surface faces at least substantially the same direction as the oblique blade surface that partially defines the active cutting edge.

14. The AFP cutter blade assembly of claim 3, further comprising a face surface that is at least substantially smoothly continuous when the AFP cutter blade assembly is in either of the first cutter blade configuration and the second cutter blade configuration, wherein each of the reversible blade insert and the blade base forms a portion of the face surface.

15. The AFP cutter blade assembly of claim 3, further comprising a pivot pin that is operatively coupled to each of the blade base and the one or more linkage arms; wherein the pivot pin is configured to pivot about the blade base pivot axis to enable each linkage arm of the one or more linkage arms to pivot relative to the blade base.

16. The AFP cutter blade assembly of claim 15, wherein the pivot pin is fixedly coupled to one of:
   (i) the blade base; and
   (ii) the one or more linkage arms.

17. An automated fiber placement (AFP) cutter system, comprising:
   a plurality of instances of the AFP cutter blade assembly of claim 3; and
   an actuator assembly configured to selectively translate the active cutting edge of the reversible blade insert of each AFP cutter blade assembly toward a respective fiber tow to selectively cut the respective fiber tow.

18. The AFP cutter system of claim 17, wherein the plurality of AFP cutter blade assemblies are configured such that the lateral surfaces of each pair of adjacent reversible blade inserts of the plurality of AFP cutter blade assemblies are positioned adjacent to one another in a close-fit arrangement.

19. The automated fiber placement (AFP) cutter blade assembly of claim 3, wherein the cutting edge bias angle is in the range of 5-30 degrees.

20. The AFP cutter blade assembly of claim 3, wherein the one or more linkage arms are configured to be pivotally coupled to a yoke of an actuator assembly.

\* \* \* \* \*